April 28, 1953  M. J. BOLTON  2,636,820
SOLDER FOR CERAMICS
Filed July 29, 1949
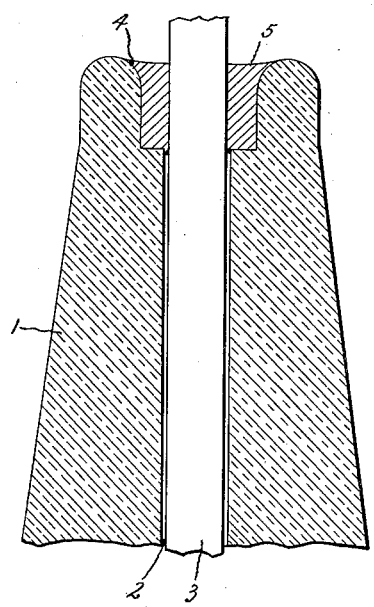
Inventor:
Michael J. Bolton,
by ⎯⎯⎯⎯
  His Attorney.

Patented Apr. 28, 1953

2,636,820

UNITED STATES PATENT OFFICE 2,636,820

SOLDER FOR CERAMICS

Michael J. Bolton, Pittsfield, Mass., assignor to General Electric Company, a corporation of New York Application July 29, 1949, Serial No. 107,487

2 Claims. (Cl. 75—175)

The present invention relates to a solder for joining ceramic parts and to a ceramic seal comprising the same. It is particularly concerned with a solder capable of wetting a ceramic surface and forming therewith a fluid-tight seal.

The usual solder methods of making a seal with a ceramic part, particularly a seal between a ceramic and a metal part, have included the prior metallizing or metal coating of the ceramic surface by various means to provide a metallic surface coating to which the usual solders would adhere in the same manner as to an ordinary metal surface. Because of the number of separate operations involved in making these seals, including the metallization of the ceramic surface as, for example, by means of a platinum chloride glaze generally followed by the electroplating of layer of copper thereon before carrying out the actual soldering operation, such seals have been rather costly. In addition such seals have been subject to certain other disadvantages in that the metal coating or glaze in many cases was not firmly united to the underlying ceramic body or the metal coating was alloyed away by the solder.

One object of the present invention is to provide a solder capable of wetting and sealing directly to a ceramic surface.

Another object of the invention is to provide a fluid-tight ceramic seal, which term includes both ceramic-to-ceramic and ceramic-to-metal seals, which is inexpensive and simple to make.

A more specific object of the invention is to provide a soldered ceramic seal comprising a solder capable of wetting the ceramic surface and composed of tin, lead and indium.

The term "ceramic" as used herein and in the claims includes glass, porcelain and quartz bodies all of which are characterized by the smooth glassy surface which has heretofore presented the greatest sealing or soldering problems.

The solder of the present invention consists essentially of 5 to 20 percent lead, 10 to 30 percent indium, balance tin. A preferred solder having a melting point of about 155° C. consists of 18 percent lead, 12 percent indium and 70 percent tin.

A preferred method of employing this solder in the sealing of a glazed porcelain part to a metal body is illustrated in the accompanying drawing showing somewhat schematically a cross-sectional view of a bushing structure comprising a portion of a porcelain insulator bushing 1 having a vertical opening 2 therein for receiving a copper stud 3. A cup-shaped cavity 4 at the upper end of the bushing provides an annular channel around the stud 3 which is filled with the solder 5. This arrangement provides a convenient means for obtaining a good solder seal between the walls of the bushing defining the cavity 4 and the stud 3.

In preparing the seal shown in the drawing, the surfaces of the stud 3 and cavity 4 which are to be soldered are cleaned to free them of oil, grease and any other substances which would interfere with the soldering operation and are then assembled as shown. The assembly is then heated to a temperature within 5 or 10 degrees of the melting point of the solder and into the joint between the ceramic body and the stud is poured the tin-lead-indium solder which has previously been heated to a temperature 20 or 30 degrees above its melting point. The assembly is then allowed to cool and the bond between the solder and the metal and ceramic surfaces is formed.

The resultant seal is fluid-tight and withstands air pressures in excess of 25 lbs./sq. in. The seals withstand alternate heating and cooling between temperatures of 5 and 140° C. in spite of the differences in the expansion characteristics of the metal and porcelain. Electrical tests have also shown the value of the seals formed in accordance with the present invention. For example, in the manufacture of a capacitance divider bushing, if an ordinary indium-free, lead-tin solder is poured into the joint between the ceramic and metal parts, low capacitance and high radio noise is exhibited because the solder simply freezes and pulls away from the ceramic surface. On the other hand by employing the present solder, the joints are fully sealed and satisfactory capacitance and low radio noise are obtained.

While the invention has been specifically described with reference to a particular method of forming a glazed porcelain-to-metal seal, it is to be understood that it is not limited thereto. Other satisfactory soldered joints which have been made include glass-to-glass, glass-to-copper, glass-to-steel, porcelain-to-copper, porcelain-to-steel and porcelain-to-porcelain. In making all such seals it is only necessary to introduce the molten solder into the joint between the parts to be joined, after first heating the parts to a temperature approximately equal to the melting or solidifying temperature of the solder.

What I claim as new and desire to secure by Letters Patent of the United States is:

1. A solder capable of forming a fluid-tight seal with the glassy surface of a ceramic body, said solder consisting essentially of an alloy of 5 to 20 percent lead, 10 to 30 percent indium, balance tin.

2. A solder for joining ceramic parts having glassy surfaces consisting of 70 percent tin, 12 percent indium and 18 percent lead.

MICHAEL J. BOLTON.

References Cited in the file of this patent

UNITED STATES PATENTS

| Number | Name | Date |
|---|---|---|
| 1,722,016 | Ronci | July 23, 1929 |
| 2,035,241 | MacLean | Mar. 24, 1936 |
| 2,163,409 | Pulfrick | June 20, 1939 |
| 2,163,410 | Pulfrick et al. | June 20, 1939 |
| 2,202,500 | Lopp | May 28, 1940 |
| 2,464,821 | Ludwick et al. | Mar. 22, 1949 |

OTHER REFERENCES

Mample: Treatise in Metals and Alloys, vol. 21, 1945, pages 702–707 (particularly pages 704 and 705).

Rose: Treatise in Scientific American, April 1944, pages 154–156 (page 155 relied upon).

Bondley: Treatise in Electronics, July 1947, page 99 (complete article, pages 97–99).